Dec. 10, 1935.　　H. JOHANSEN　　2,023,527
YIELDABLE COUPLING MEMBER
Filed Dec. 31, 1934
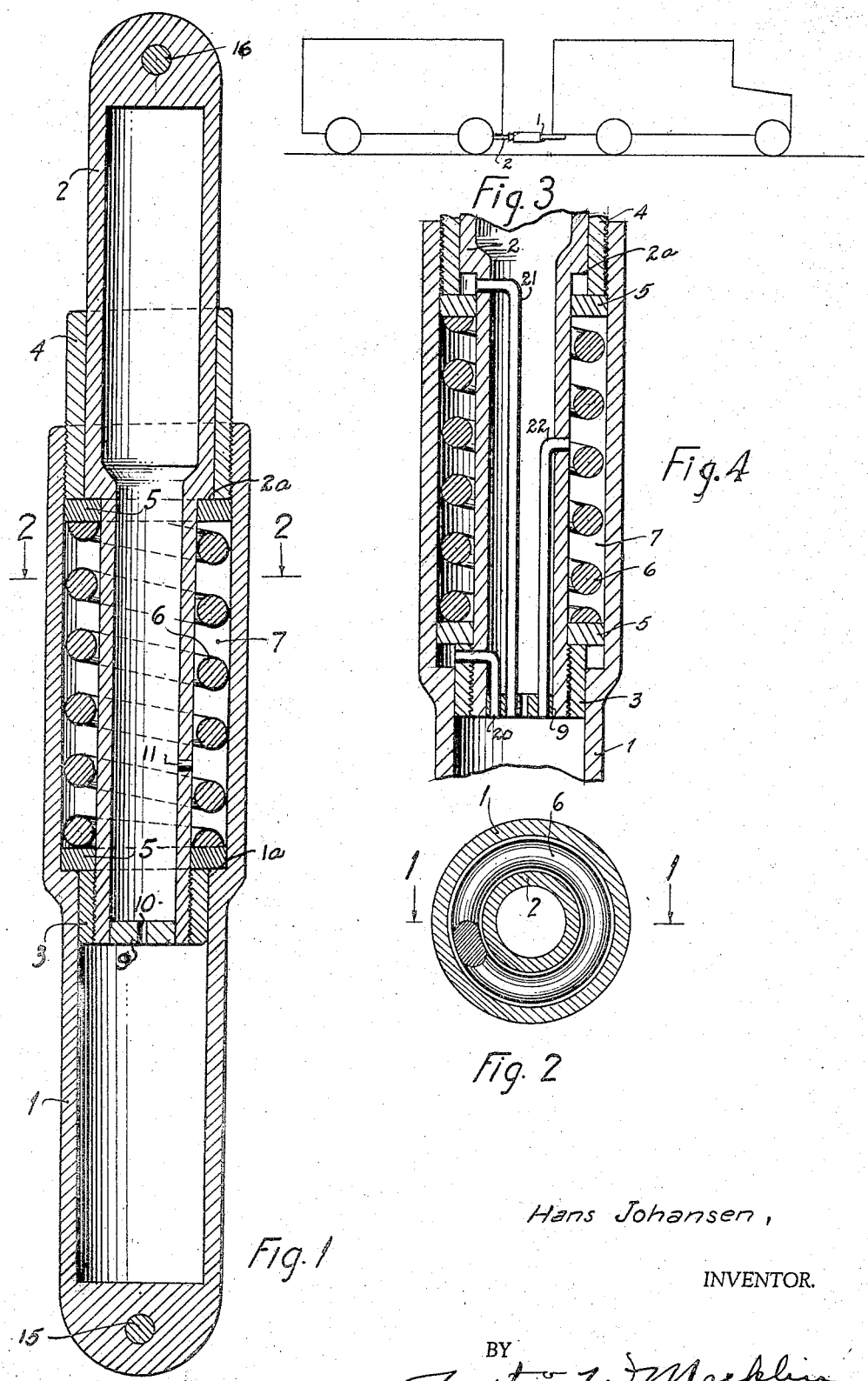
Hans Johansen,
INVENTOR.
BY
ATTORNEY.

Patented Dec. 10, 1935

2,023,527

UNITED STATES PATENT OFFICE 2,023,527

YIELDABLE COUPLING MEMBER

Hans Johansen, Cleveland, Ohio

Application December 31, 1934, Serial No. 759,879

7 Claims. (Cl. 267—70)

My invention relates to a yieldable coupling member for vehicles or the like.

It is an object of this invention to make a coupling member that will cushion the shock between two or more vehicles.

A further object of this invention is to so construct such a device that it will resist relative movement and cushion the shock, in both the expanding and contracting directions, by means of compression created within the coupling member in either the pushing or pulling direction. That is, either under tension or compression forces exerted on the coupling, compression within the member offers resistance thereto.

Another object of my invention is to construct a device of the above named character which is sturdy, durable, and very simple, and which is capable of economical construction and being formed of readily obtainable materials.

Other objects and advantages of my invention will become more apparent from the following description, reference being made to the accompanying drawing, in which like reference characters are employed to designate like parts throughout the same.

In the drawing—

Fig. 1 is a longitudinal cross sectional view of the improved coupling member.

Fig. 2 is a transverse cross sectional view taken along the line 2—2 of Fig. 1.

Fig. 3 is a diagrammatic view illustrating the use of my coupling in connection between two vehicles.

Fig. 4 is a longitudinal cross sectional view of a modified form of my device.

Referring to the drawing, as illustrated in Fig. 1, the device comprises essentially telescopically mounted hollow sections 1 and 2 having opposed shoulder portions indicated 1a and 2a. The sections are provided with retaining sleeve members 3 and 4 respectively, each of which also acts as a bearing or guide for the section 1 or 2, which may be secured thereto as by means of threads.

It will be noted that the section 1 is enlarged at the end portion while the section 2 is reduced at its overlapping or telescoping portion, thus providing a central chamber designated 7. Slidably mounted in the chamber 7 are abutment washer members 5, which may be constructed of leather, steel or any other suitable material. Coaxial with the chamber 7 is a compression member 6 as shown, in the form of a spring, normally urging the device to its expanded position. The abutment washer members are loosely fitted in the chamber 7 so that the vacuum created back of the washer member will not be retained therein, although it may be created on sudden movement of the sections, which adds to the cushioning effect of the device. It will be noted that with the above mentioned construction I have also provided for the twisting or torsional force between the vehicles.

While I have illustrated the resilient means as a coil spring, any compression means may be provided, such as for instance a liquid under pressure, and supplied to the chamber 7 by a suitable conduit not shown.

To increase the cushioning effect of my coupling, as illustrated in Fig. 1, the open end of the section 2 may be provided with a plug or cap 9, which may be secured thereto by means of welding or brazing, having a restricted aperture 10. An aperture indicated by the reference character 11 may also be provided in the section 2.

In operation my device may be secured to the tractor and trailer, or to two or more vehicles by means of bolts, shown at 15 and 16, or any suitable connection with the members 1 and 2. It will be seen that as section 1 is moved in either direction relative to section 2, pressure or compression is built up in the chamber 7. When the device is moved in the direction of the expanded positions, it will be noted that the washer member 5 will be carried by the retaining sleeve member 4 inwardly toward its opposed sleeve member 3. This compresses the spring 6 and compresses the air in the chamber 7. The compressed air in this member will act as a cushioning means and will additionally compensate for the shock between the two vehicles. During this operation a vacuum will be created in the hollow portion of the section 1.

In the event the device is contracted and shortened by compressing force, from the position illustrated in Fig. 1, it will be seen that the washer 5 will be urged toward the retaining sleeve member 3 by the shoulder portion 2a of the section 2, thus again compressing the air in the chamber 7. While the air in this chamber is being compressed it will be noted that the air in the hollow portions of the sections 1 and 2 will also be compressed and will also aid in compensating for the shock between the two vehicles.

It will also be noted that under conditions of the connected vehicles running on the road, the sections 1 and 2 may be moved in a direction opposite to each other alternately, but a similar result will be obtained at all times. The washer members will always be urged toward each other by means of the retaining sleeve members 3 and 4 and will in each case of relative movement compress the air in the chamber 7.

Under certain operating conditions, it may be desirable to equalize or relieve the pressures built up in the section 1, chamber 7 and the spaces provided by the washer elements 5 and the shoulder portions 1a and 2a. For this purpose conduits 20, 21 and 22 are provided, as illustrated in Fig. 4.

It will be seen that the amount of pressure created or built up in the chamber is governed by the position of the section members in relation to each other, or in other words, on the amount of load imposed on the device in either direction. If the load in either direction is great, the washers are moved a considerable distance so that a great pressure or compression is built up in the chamber.

While embodiments of the shock absorbing coupling provided by my invention have been illustrated and described in detail, it should be understood that the invention is not limited to these details of construction, and that numerous changes and modifications can be made without departing from the scope of the following claims.

I claim:

1. A coupling member comprising two telescopically mounted hollow sections, the said sections having opposed shoulder portions, washer elements slidably mounted within said sections and engaged by the shoulders, mechanical yielding means extending between said washer elements to normally urge the said sections apart, retaining sleeve members secured to the said sections and coacting with the yielding means to securely hold the said sections together, a yieldable medium entrained within the hollow portions of said sections, and an equalization chamber.

2. A coupling member comprising two coacting hollow sections, the outer section having an inwardly facing shoulder portion, the inner section having an opposedly facing shoulder portion, washer elements abutting each of said shoulder portions, one of said washer elements being movable away from its coacting shoulder during expansion of the device, the other of said washer elements being similarly movable during the contraction of the member, mechanical yielding means extending between the said washer elements, retaining members associated with the said sections to securely hold the coupling member together, a fluid yieldable means entrained within the hollow portions of the said hollow sections, and an equalization chamber.

3. A coupling member comprising two telescopically mounted sections, the outer section being provided with an enlarged portion, the inner section being provided with a reduced portion, the said portions defining a central chamber, slidably mounted washer elements associated with the said chamber, mechanical yielding means extending between the said washer elements, retaining members secured to the said sections to securely hold the said coupling member together, a compressible medium entrained within the hollow portions of said sections, and a means of equalization.

4. A coupling member of the character described, comprising two telescopically mounted sections, the said sections having shoulder portions extending in radial planes and defining a central chamber within said coupling member, washer elements abutting each of said shoulder portions, one of said washer elements being operable by movement during expansion of the coupling member, the other of said washer elements being similarly operable during contraction of the said coupling member, the said washer elements thereby moving inwardly, mechanical yielding means extending between the said washer elements and adapted to maintain compression in the said chamber during movement of either of said sections, and retaining members secured to the sections to hold the said coupling member parts in an assembled relation, a fluid compressible means entrained between said washer elements, a fluid compressible means entrained within the hollow portion of one of said sections, an equalization chamber within a part of the hollow portion of the other of said sections, and a means of connecting said fluid compressible means with said equalization chamber.

5. A vehicle coupler assembly comprising a large hollow section, a smaller hollow section telescopically fitted within a part of the hollow chamber of said larger section, oppositely disposed shoulders on said sections, compression rings mounted on said shoulders, a mechanical yielding means supported by said compression rings, a yieldable means entrained within the hollow portions as formed by the assembly of the two sections and as formed during the actuation of said assembly, an equalization chamber for said yieldable means formed in the end of the hollow portion of said larger section, and a circulatory means connecting said hollow portions and said equalization chamber.

6. A vehicle coupler comprising a large hollow section and a smaller hollow section, said smaller hollow section being telescopically fitted within a part of the hollow chamber of said larger section, the remaining part of said hollow chamber of said larger section providing means of equalization, oppositely disposed shoulders formed on the outer surface of said smaller section and the inner surface of said larger section, compression rings abutting said shoulders, a mechanical yieldable means between said compression rings, the yieldable means entrained within the chambers as formed by the assembly of the two sections and as formed by the actuation of the assembly, and a circulatory means connecting said chambers and said equalization chamber.

7. A vehicle coupler comprising a large hollow section, a smaller hollow section, said smaller hollow section being telescopically fitted within a part of the hollow chamber of said larger section and having its hollow chamber communicating with a part of said hollow chamber of said larger section, a shoulder formed on the inner surface of said larger section, a shoulder formed on the outer surface of said smaller section, compression rings abutting said shoulders of said sections and fitted to the outer surface of said smaller section, a mechanical yieldable means between said compression rings, a fluid yieldable means within the hollow chamber of said smaller section and the portion of the hollow chamber of said larger section as communicates with that of the smaller section, and a means to equalize or release said fluid yieldable means.

HANS JOHANSEN.